United States Patent Office 3,390,524
Patented July 2, 1968

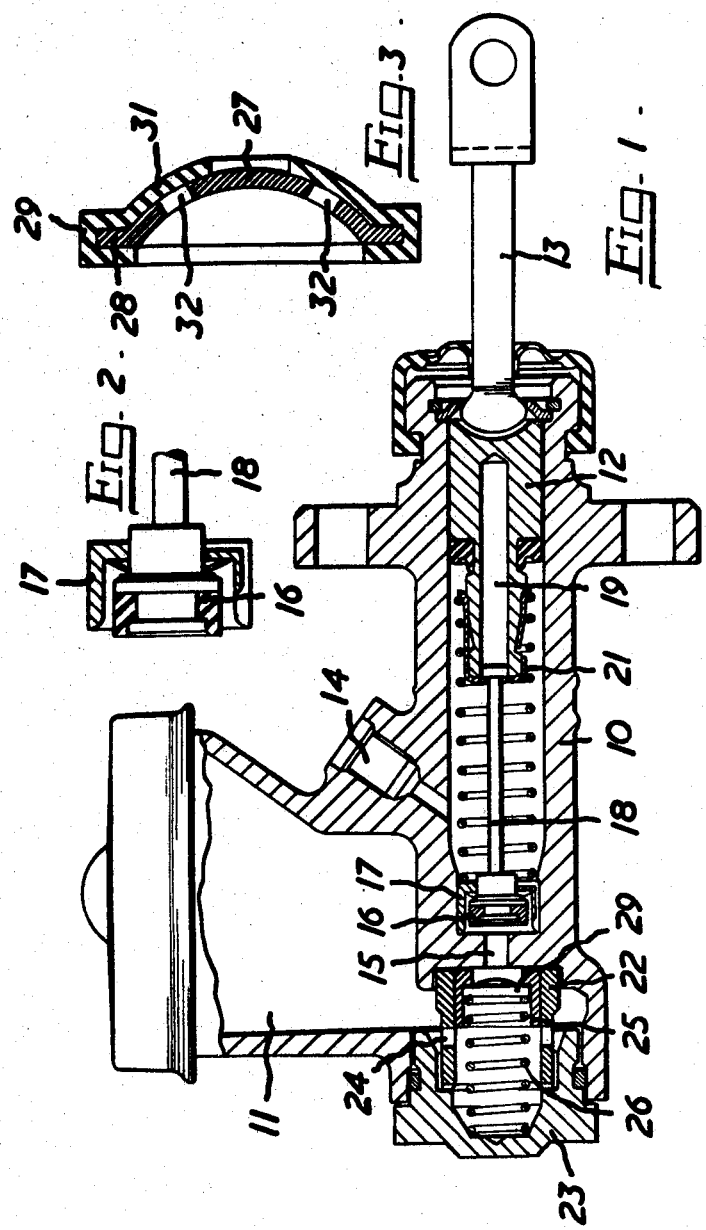

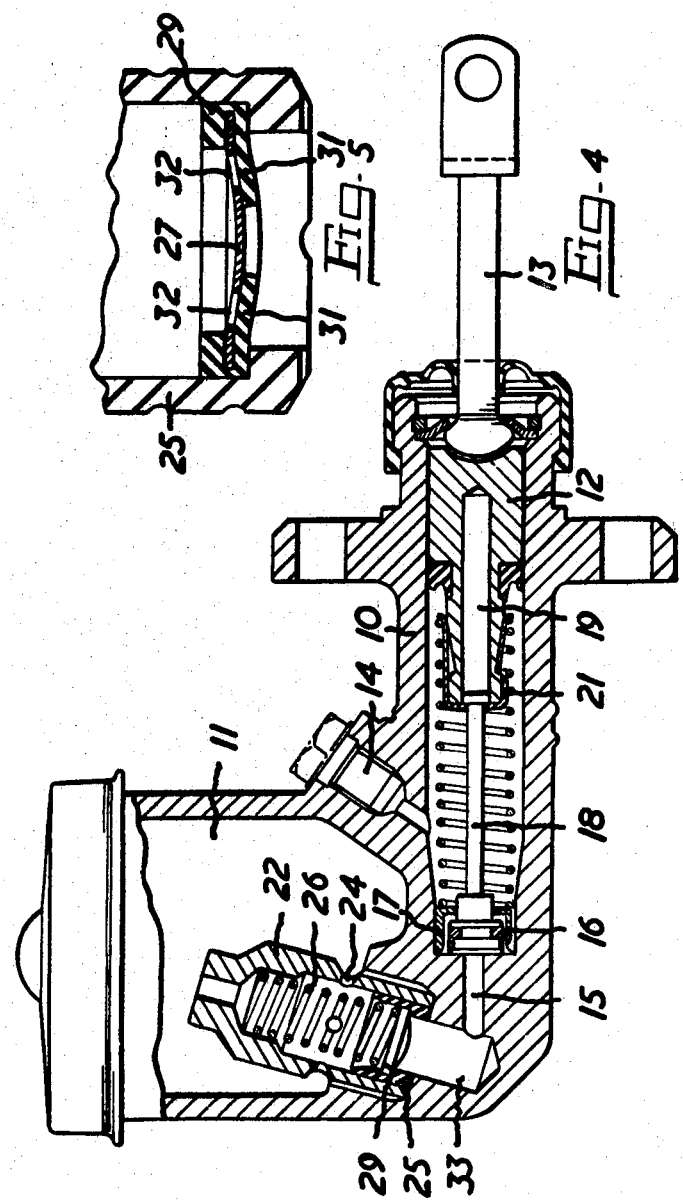

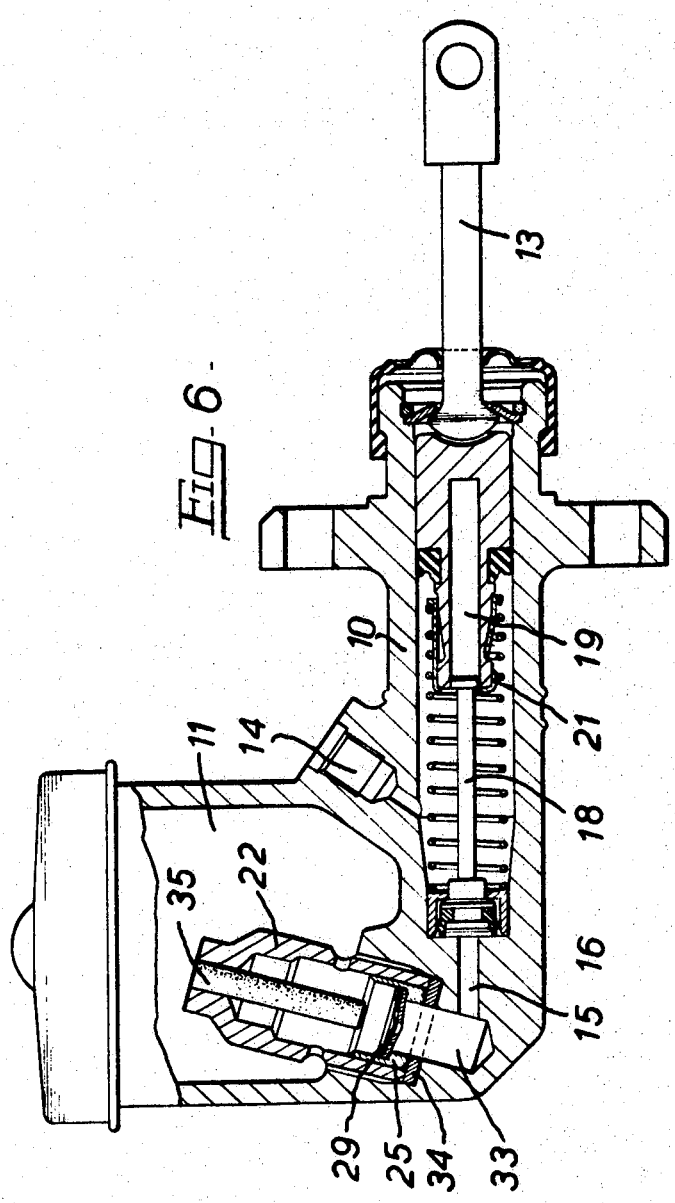

3,390,524
HYDRAULIC BRAKING SYSTEMS FOR VEHICLES
Alfred Yardley, Blackheath, and George B. Spence, Styvechale, Coventry, England, assignors to Girling Limited, Tyseley, Birmingham, England, a British company
Filed Oct. 26, 1965, Ser. No. 505,266
Claims priority, application Great Britain, Oct. 30, 1964, 44,273/64
5 Claims. (Cl. 60—54.6)

ABSTRACT OF THE DISCLOSURE

In an hydraulic braking system incorporating a master cylinder and a recuperation reservoir, a recuperation port in the master cylinder, which is open only when the master cylinder piston is fully retracted, communicates with the reservoir through an auxiliary cylinder in which works a piston biassed towards the end of the cylinder in communication with the recuperation port and incorporating a passage controlled by a one-way valve permitting flow through the passage only in a direction towards the master cylinder.

---

This invention relates to improvements in hydraulic braking systems of the kind in which fluid under pressure is supplied to one or more slave cylinders of wheel brakes from the pressure space of a master cylinder combined with a recuperation reservoir with which the pressure space communicates through a recuperation port which is open when the master cylinder piston is in the fully retracted position and closed when the piston is advanced to apply the brake.

When the vehicle is in motion any irregularities in the brake drum or disc or lack of truth in its mounting are liable to knock the piston of its associated brake slave cylinder back into the cylinder and force liquid back to the master cylinder reservoir with the result that additional pedal travel is required to return this liquid in the next application of the brake.

This trouble is particularly liable to occur with disc brakes when the vehicle is cornering, and is accentuated in braking systems in which the friction pads are maintained in light rubbing contact with the disc in the off position of the brake.

According to our invention, in an hydraulic braking system of the kind set forth there is provided between the recuperation port the master cylinder and the reservoir an auxiliary cylinder in which works a piston biassed towards the end of the cylinder in communication with the recuperation port and incorporating a passage controlled by a one-way valve permitting flow through the passage only in a direction towards the master cylinder.

When knock-back occurs with the brake in the off position fluid forced back from a slave cylinder or cylinders into the pressure space of the master cylinder can flow through the recuperation port into the auxiliary cylinder in which it forces back the piston against the biassing means, and when the knock-back conditions have passed the piston is returned by the biassing means to return the displaced fluid to the slave cylinder or cylinders.

The one-way valve in the piston in the auxiliary cylinder allows fluid from the reservoir to be fed to the master cylinder in the normal way.

Two embodiments of our invention are illustrated by way of example in the accompanying drawings in which:

FIGURE 1 is a longitudinal section of a combined master cylinder and reservoir for an hydraulic braking system incorporating an auxiliary cylinder to accommodate knockback.

FIGURE 2 is a section on a larger scale of the recuperation valve.

FIGURE 3 is a section on a larger scale of the one-way valve in the piston of the auxiliary cylinder.

FIGURE 4 is a section similar to FIGURE 1 but showing a modified arrangement of the auxiliary cylinder.

FIGURE 5 is a section on a larger scale of the piston and one-way valve of the auxiliary cylinder in FIGURE 4.

FIGURE 6 is a section similar to FIGURE 1 but showing a further modified arrangement.

In the embodiment shown in FIGURES 1 to 3 the master cylinder is of known type and comprises a cylinder 10 integral with a recuperation reservoir 11. A piston 12 working in the cylinder is actuated by a pedal through a push-rod 13. The pressure space in front of the piston has a lateral outlet 14 adapted to be connected to the slave cylinders of wheel brakes.

A recuperation port is formed by an axial passage 15 in the forward end of the cylinder and is controlled by a valve 16 of known type comprising a head slidable in a cage 17 and attached to a stem 18 of which the rear end is enlarged and is slidably engaged in an axial bore in the piston 12 in which it is retained by a clip 21.

When the piston is in the fully retracted position shown in FIGURE 1 the valve head is withdrawn from the end of the cylinder so that the passage 15 is open, and when the piston 12 is advanced to apply the brake the valve head is urged into engagement with the end wall of the cylinder to close the passage 15.

The passage 15, instead of leading directly into the reservoir in the usual way, leads into the inner end of an auxiliary cylinder 22 coaxial with the master cylinder. The auxiliary cylinder is held into a recess in the end of the master cylinder by a plug 23 screwed into an opening in the end of the unit. The auxiliary cylinder is in communication with the reservoir through one or more radial ports 24 spaced from the inner end of the cylinder. A piston 25 working in the auxiliary cylinder is normally held by a spring 26 in engagement with the inner end of the cylinder. A passage through the piston is controlled by a one-way valve shown in detail in FIGURE 3.

The valve comprises a domed metal disc 27 having a radial peripheral lip 28 which is embedded in a rubber or like rim 29 which is a push or press fit in the piston. On the face next to the inner end of the cylinder the rim has a domed flange 31 extending inwardly over the convex surface of the disc 27 and over holes 32 in the disc.

The flange 31 can flex away from the disc to allow liquid to flow freely through the valve, in a direction towards the passage 15, for recuperation of the hydraulic system, but prevents flow in the other direction.

The valve is held against a shoulder in the piston by the spring 26.

The capacity of the auxiliary cylinder is sufficient to accommodate the volume of liquid liable to be forced into the pressure space of the master cylinder by knock-back without the piston 25 being forced far enough into the auxiliary cylinder to uncover the ports 24.

A small clearance is provided between the piston 25 and the wall of the auxiliary cylinder to allow restricted communication between the master cylinder and the reservoir to take care of changes in the volume of the hydraulic fluid in the system due to changes in temperature, or over recuperation of the hydraulic system due to vacuum draw during the initial return stroke of the piston.

The construction shown in FIGURES 4 and 5 is substantially the same as that shown in FIGURES 1 to 3 and the same reference numerals have been applied to corresponding parts. The only difference is that the auxiliary cylinder is screwed into a recess in the bottom of the reservoir which communicates with the master cylinder through an extension 33 of the recess leading to the passage 15.

In a modification of the embodiments described above the spring 26 which biases the piston 25 into engagement with the inner end of the auxiliary cylinder 22 may be replaced by a magnetic system.

In the arrangement shown in FIGURE 6 the combined master cylinder 10 and reservoir 11 and the auxiliary cylinder 22 are made of aluminum or other non-magnetic material. An annular washer 34 of magnetic material such as mild steel is clamped between the inner end of the auxiliary cylinder 22 and the inner end of the recess into which it is screwed.

The metal disc 27 is made of material which is permanently magnetised and a permanent magnet 35 is fixed in the outer end of the auxiliary cylinder and extends axially into it. The piston and the magnet are oppositely magnetised so that the magnet repulses the piston.

Normally the inner end of the piston is in contact with the steel washer 34 and is held by the magnetic force between itself and the washer at the inner end of the cylinder.

When knock-back occurs the fluid pressure forces the piston outwardly away from the washer 34 and towards the magnet 35, and when the pressure is relieved the magnet repels the piston which moves inwardly again into engagement with the washer.

In a modification the washer 34 may be omitted in which case only the repulsion between the magnet and the piston is relied on for returning the piston to its normal position.

Where the auxiliary cylinder is substantially vertical as shown in FIGURES 4 and 6 the magnet 35 may be omitted, the piston 25 returning under gravity when it has been moved away from the washer by fluid pressure.

We claim:

1. A master cylinder and reservoir assembly for a vehicle hydraulic braking system comprising a master cylinder, a first piston axially movable in the cylinder to displace liquid from a pressure space in front of the first piston, a fluid recuperation reservoir connected with the master cylinder, a recuperation port in the cylinder which is open to provide communication between the pressure space and the recuperation reservoir only when the first piston is in a fully retracted position and closed when the first piston is advanced to apply pressure to the liquid in the pressure space, an auxiliary cylinder providing communication between the recuperation port and the recuperation reservoir, a second piston working in said auxiliary cylinder, means biasing said second piston towards the end of said auxiliary cylinder in communication with said recuperation port, passage means incorporated in said second piston, and a one-way valve controlling said passage means to permit flow through said passage means only in a direction from the recuperation reservoir towards said master cylinder.

2. A master cylinder and reservoir assembly as claimed in claim 1, wherein said biassing means comprise spring means.

3. A master cylinder and reservoir assembly as claimed in claim 1, wherein said biassing means comprise magnetic means.

4. A master cylinder and reservoir assembly as in claim 1 and further including a restricted passage bypassing said second piston and permitting liquid to pass between said master cylinder and said recuperation chamber with changes in the volume of liquid in the system due to changes in temperature.

5. A master cylinder and reservoir assembly for a vehicle hydraulic braking system comprising a master cylinder, a first piston axially movable in the cylinder to displace liquid from a pressure space in front of the first piston, a fluid recuperation reservoir associated with the master cylinder, a recuperation port in the cylinder, a valve controlling said port and coupled to the first piston whereby said port is opened when said piston is in a fully retracted position and closed when said piston is advanced to apply pressure to the liquid in the pressure space, an auxiliary cylinder providing communication between the recuperation port and the recuperation reservoir, a second piston working in said auxiliary cylinder, means biassing said second piston towards the end of said auxiliary cylinder in communication with said recuperation port, passage means incorporated in said second piston, and a one-way valve controlling said passage means to permit flow through said passage means only in a direction from the recuperation reservoir towards said master cylinder.

References Cited

UNITED STATES PATENTS

| | | | |
|---|---|---|---|
| 2,112,356 | 3/1938 | Bock | 60—54.6 |
| 2,911,004 | 11/1959 | Whitten | 60—54.6 X |
| 3,307,667 | 3/1967 | Maurice | 60—54.6 X |

MARTIN P. SCHWADRON, *Primary Examiner.*

ROBERT R. BUNEVICH, *Examiner.*